(12) United States Patent
Coleman et al.

(10) Patent No.: US 6,200,186 B1
(45) Date of Patent: Mar. 13, 2001

(54) POP HOPPERS

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/504,105

(22) Filed: Feb. 14, 2000

(51) Int. Cl.⁷ ................................................. A63H 33/00
(52) U.S. Cl. ....................... 446/73; 446/81; 446/309; 446/352
(58) Field of Search ........................ 446/71, 72, 73, 446/81, 297, 308, 309, 314, 320, 330, 352, 404; 426/104, 112, 132, 134

(56) References Cited

U.S. PATENT DOCUMENTS

| | | | |
|---|---|---|---|
| D. 416,371 | * 11/1999 | Mehdikhan | D1/104 |
| 559,343 | * 4/1896 | Rehlin . | |
| 3,797,166 | * 3/1974 | Murray . | |
| 4,244,138 | * 1/1981 | Holahan et al. . | |
| 5,681,200 | * 10/1997 | Shecter | 446/76 |
| 5,732,953 | * 3/1998 | Tamura | 446/320 |
| 6,074,266 | * 6/2000 | Zak | 446/73 |

* cited by examiner

*Primary Examiner*—Jacob K. Ackun
*Assistant Examiner*—Jeffrey D. Carlson
(74) *Attorney, Agent, or Firm*—Melvin L. Crane Agent

(57) ABSTRACT

A candy-toy device which includes a housing. The housing includes a pivot arm which functions to move a cross-armed jack up and down along lower and upper slide tracks when forced by a pushbutton. The pivot arm activates an electrical on-and-off switch which controls an electrical circuitry which produces a desired sound as the pivot arm moves the cross-armed jack up and down along the upper and lower slides. A candy pop is secured to an upper surface of the upper slide track so that the candy pop moves up and down as the jack is moved up and down. The sounds can be made in alternation as the pivot arm closes and opens the on-and-off switch.

5 Claims, 1 Drawing Sheet

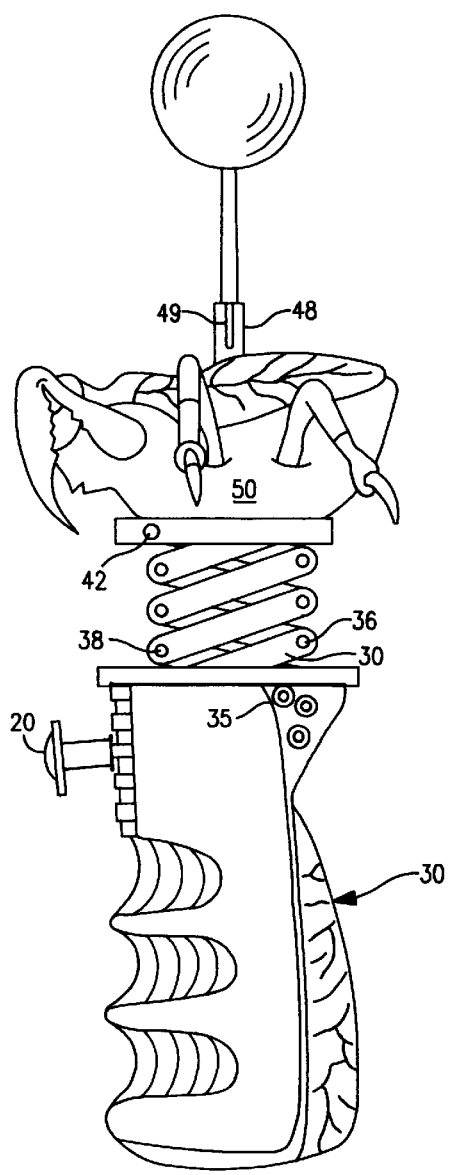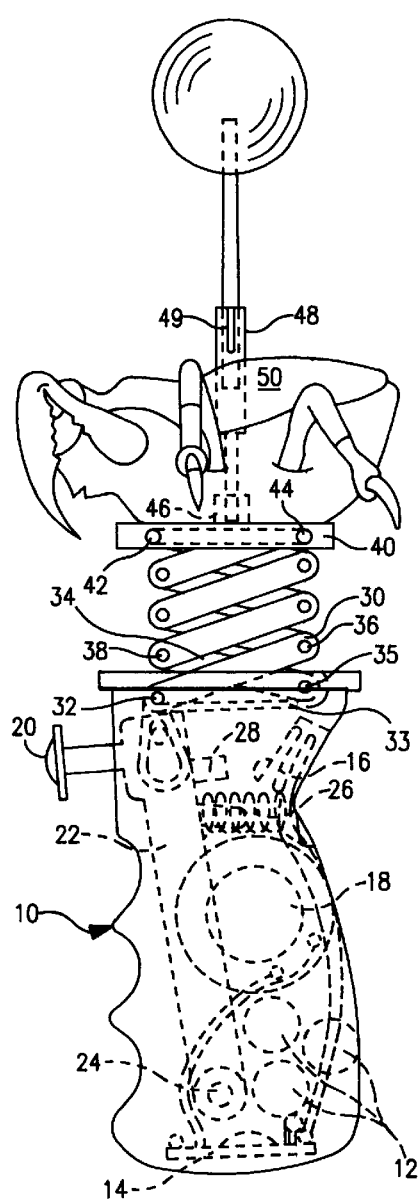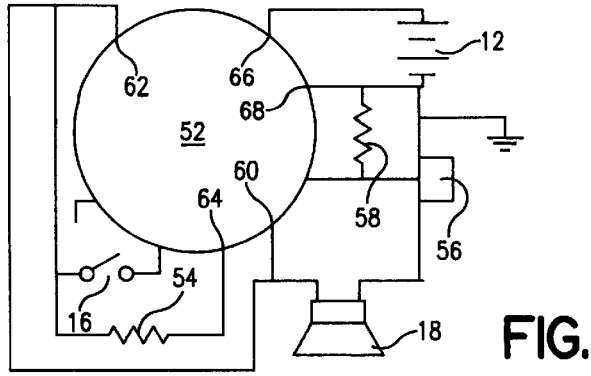

POP HOPPERS

This invention is directed to a fun device onto which a candy pop is secured and more particularly to a fun device which produces sounds and which raises and lowers a candy pop as if the candy pop is hopping.

1. Background of the Invention

Heretofore candy pop fun devices have been patented by applicants by which different actions by the candy holder or candy pop take place. In this invention, a candy pop is secured onto a jack means by which the candy pop is raised and lowered which is similar to the candy pop hopping up and down.

2. Objects of the Invention

It is therefore an object of the invention to provide a fun device which provides hopping sounds simultaneously with a candy pop being raised and lowered as if hopping.

Another object is to provide a fun device by which a candy pop is made to hop with sounds in combination with different characters which are optional.

Still another object is to provide a fun toy which can be enjoyed by adults as well as by children.

Other objects and advantages will become obvious to those skilled in the art upon a review of the drawings, specification and claims.

BRIEF DESCRIPTION OF THE DRAWINGS

FIG. 1 is a side, upright view illustrating an assembled fun device;

FIG. 2 is a side view as shown in FIG. 1 which illustrates the inner working parts which are shown by dotted lines; and FIG. 3 illustrates a circuit board circuit which produces sounds in accordance with the electrical circuitry.

DETAILED DESCRIPTION

Now referring to the drawings in which the same parts are designated by the same reference characters throughout the different views, FIGS. 1 and 2 of the drawings illustrate a housing 10 which includes therein an electrical source 12 such as batteries which provide electrical power to a circuit board 14 which is illustrated in FIG. 3. The power source is controlled by a contact switch 16. The power source is connected with an integrated circuit which produces desirable sounds that are made by a speaker 18. A pushbutton 20 extending from the housing is secured to a pivot arm 22 that pivots at one end on a pivot pin 24. The pivot arm extends from the pivot pin near the lower end of the housing up to the pushbutton. A tension coil spring 26 is secured in the housing in order to force the pivot arm toward the pushbutton. The pivot arm has a projection 28 near the upper end which makes contact with the contract switch 16 in order to activate the electrical circuitry to make sounds via the speaker. The upper end of the pivot arm has one arm 30 of a jack secured thereto. The arm 30 is connected to the pivot arm by a pin 32 which rides in a lower slide track 33 located at the upper end of the housing. A second arm 34 of the jack is pivotably secured in a fixed position by a pin 35 to the upper end of the housing at an opposite end of the lower slide track. The jack is formed by crossed arms which are pivoted on a pin at their ends. As shown, the arm 30 is pivoted by a pin 36 and arm 34 is pivoted by a pin 38. Each of the arms are in turn pivoted at their ends on pivot pins. The uppermost crossed arms are secured to an upper slide track 40. One arm is pivoted on a pin 42 at a fixed position on an end of the slide track and the other cross arm is pivoted on a pin 44 which slides in the slide track. One end of a candy stick holder 46 is secured on an upper surface of the upper slide track and the opposite end 48 of the candy stick holder has an aperture with at least one linear slit 49 so that the end forms an expandable candy stick holder. Therefore, the candy stick holder can secure slightly different diameter candy sticks therein. A comical character 50 is shown between the upper slide track and the expandable end of the candy stick holder. Any suitable character can be placed on the candy stick holder or the character can be left off if desired.

FIG. 3 illustrates the electrical circuitry. As shown, the circuitry includes an LM3909-8 pin integrated circuit 52, a power supply 12 (LR44) with a positive side connected to one pin 66 of the integrated circuit and the ground connected to an adjacent pin 68 of the integrated circuit, a normally open contact switch 16, a 1.5 meg ohm resistor 54 connected to the positive side of the switch and to the integrated circuit, a T8050 transistor 56 connected to ground and to one side of an 8 ohm 1.2/5 w speaker 18, a 570 ohm resistor 58 connected from ground and an input to the transistor. The other side of the speaker is connected with one pin 60 of the I.C. and a second pin 62 which is connected with one side of the switch and the 1.5 meg ohm resistor which is connected at one end to the I.C. at 64.

In operation, the pushbutton 20 is pushed which moves the pivot arm 22 toward the switch 16 to close the switch. Upon closure of the switch, the electrical circuitry is activated in order to make the desired sound in accordance with the integrated circuit. Simultaneously, the pivot arm moves the end of the movable arm in the lower slide track which raises the ends of the arms. Raising the ends of the arms moves the movable arm in the upper slide track in order to raise the upper slide track, the character and the candy pop. When the pushbutton is released, the spring 26 forces the pivot arm, jack and upper slide track back to their normal rest position. If one desires, the pushbutton can be pushed and released alternately in order to raise and lower the jack so that the upper slide track has the appearance of hopping. As the pushbutton is pushed in, the pivot arm closes the contact switch and raises the upper slide track. When the pushbutton is released, the spring forces the pivot arm back to its normal position. Therefore, pressing and releasing the pushbutton makes a sound off-and-on and raises and lowers the upper slide track as the pivot arm moves away from and toward the pushbutton 20.

The foregoing relates to preferred exemplary embodiments of the invention, it being understood that other variants and embodiments thereof are possible within the spirit and scope of the invention, the latter being defined by the appended claims.

We claim:

1. A candy-toy device which comprises a housing, an electrical power supply within said housing, an electrical on-and-off switch for activating said electrical power supply, an integrated circuit which is activated by said electrical power supply, a speaker connected with said integrated circuit for producing sounds, a pivot arm pivoted at one end on a pivot pin, a pushbutton in contact with said pivot arm for forcing said pivot arm toward said on-and-off switch to close said electrical on-and-off switch, a spring means for forcing said pivot arm to a rest position which breaks a contact of said on-and-off electrical switch, a lower slide track and an upper slide track, a jack including a plurality a cross arms pivoted at their ends, one of said cross arms is pivotably fixed to said lower side track, one of said cross arms is fixed to said upper slide track, one of said cross arms is secured to an upper end of said pivot arm on a pivot means which is slidable along said lower slide track as said pivot arm is forced by said pushbutton toward said electrical on-and-off switch, one of said cross arms is secured to a pivot means which is slidable along said upper slide track whereby said cross-armed jack is movable up and down by movement of said pivot arm simultaneous with making a desired sound via said speaker, and a candy pop secured to an upper surface of said upper slide track.

2. A candy-toy device as set forth in claim 1, in which a candy pop holder is secured to an upper surface of said upper slide track, and a candy pop is secured to said candy pop holder.

3. A candy-toy device as set forth in claim 2, wherein said candy pop holder has an aperture with an expandable end to which one end of a candy pop stick can be secured.

4. A candy-toy as set forth in claim 2, which includes a character of a desired type secured between said upper slide track and an upper end of said candy pop holder.

5. A candy-toy device as set forth in claim 3, which includes a character of a desired type secured between an upper surface of said upper slide track and said expandable end of said candy pop stick hand.

* * * * *